United States Patent
Byun et al.

(10) Patent No.: US 8,828,596 B2
(45) Date of Patent: Sep. 9, 2014

(54) SECONDARY BATTERY INCLUDING A LOWER TERMINAL PLATE AND AN UPPER TERMINAL PLATE

(75) Inventors: Sangwon Byun, Yongin-si (KR); Yongsam Kim, Yongin-si (KR); Sooseok Choi, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 482 days.

(21) Appl. No.: 12/926,701

(22) Filed: Dec. 6, 2010

(65) Prior Publication Data

US 2011/0311863 A1 Dec. 22, 2011

(30) Foreign Application Priority Data

Jun. 16, 2010 (KR) ......................... 10-2010-0056963

(51) Int. Cl.
*H01M 2/02* (2006.01)

(52) U.S. Cl.
USPC ........... 429/178; 429/181; 429/211; 429/185; 429/163

(58) Field of Classification Search
USPC ......... 429/211, 181, 177, 178, 185, 186, 163, 429/174
See application file for complete search history.

(56) References Cited

U.S. PATENT DOCUMENTS

| | | | |
|---|---|---|---|
| 2002/0106554 A1* | 8/2002 | Nemoto et al. | 429/72 |
| 2006/0240320 A1* | 10/2006 | Cheon et al. | 429/175 |
| 2007/0026307 A1* | 2/2007 | Kim | 429/161 |
| 2009/0061307 A1* | 3/2009 | Uh | 429/178 |
| 2009/0269620 A1* | 10/2009 | Kim | 429/7 |
| 2010/0159320 A1* | 6/2010 | Kim et al. | 429/178 |
| 2011/0039152 A1* | 2/2011 | Kim et al. | 429/178 |
| 2011/0045344 A1* | 2/2011 | Kim | 429/179 |
| 2011/0052975 A1* | 3/2011 | Lee | 429/178 |
| 2011/0135976 A1* | 6/2011 | Byun | 429/56 |
| 2011/0183193 A1* | 7/2011 | Byun et al. | 429/178 |
| 2011/0244280 A1* | 10/2011 | Byun et al. | 429/61 |
| 2011/0244281 A1* | 10/2011 | Byun | 429/62 |
| 2011/0256445 A1* | 10/2011 | Kim et al. | 429/158 |

FOREIGN PATENT DOCUMENTS

KR 2001-0105524 11/2001

OTHER PUBLICATIONS

Office Action issued in corresponding Korean application, 10-2010-0056963, dated Jul. 13, 2011.

* cited by examiner

*Primary Examiner* — Raymond Alejandro
(74) *Attorney, Agent, or Firm* — Lee & Morse, P.C.

(57) ABSTRACT

A secondary battery, including an electrode assembly including a first electrode, a second electrode, and a first electrode tab and a second electrode tab connected to the first electrode and the second electrode, respectively; a case including a receiving part that receives the electrode assembly, the case having an open side; a cap plate sealing the open side of the case; and a first electrode terminal and a second electrode terminal passing through the cap plate, the first electrode terminal being connected to the first electrode tab, the second electrode terminal being connected to the second electrode tab, the first electrode terminal including a first terminal, a lower terminal plate provided at a top end of the first terminal, and an upper terminal plate provided at a top end of the lower terminal plate, the first electrode tab being connected to a bottom end of the first terminal.

17 Claims, 4 Drawing Sheets

SECONDARY BATTERY INCLUDING A LOWER TERMINAL PLATE AND AN UPPER TERMINAL PLATE

BACKGROUND

1. Field

Embodiments relate to a secondary battery.

2. Description of the Related Art

In general, secondary rechargeable batteries are capable of charging and discharging, and can be repeatedly used. Low-capacity secondary batteries, each including a single unit cell, are widely used in small portable electronic devices, such as mobile phones, notebook type computers, cameras, camcorders, and the like. On the other hand, large-capacity secondary batteries, each including multiple battery cells, may be used as motor driving power sources, such as a hybrid electric vehicle (HEV), an electric vehicle (EV), an electric scooter, or the like.

Secondary batteries are manufactured in various shapes, cylindrical, prismatic, and so on. The secondary battery is formed by accommodating an electrode assembly having a separator interposed between positive and negative electrode plates in a case together with an electrolyte, and installing a cap plate in the case. Electrode terminals connected to the electrode assembly may be exposed to the outside through the cap plate.

SUMMARY

It is a feature of an embodiment to provide a secondary battery configured to connect bus bars made of aluminum or aluminum alloy to first and second electrode terminals.

At least one of the above and other features and advantages may be realized by providing a secondary battery, including an electrode assembly including a first electrode, a second electrode, a separator interposed between the first electrode and the second electrode and insulating the first electrode and the second electrode from each other, and a first electrode tab and a second electrode tab connected to the first electrode and the second electrode, respectively; a case including a receiving part that receives the electrode assembly, the case having an open side; a cap plate sealing the open side of the case; and a first electrode terminal and a second electrode terminal passing through the cap plate, the first electrode terminal being connected to the first electrode tab, the second electrode terminal being connected to the second electrode tab, the first electrode terminal including a first terminal, a lower terminal plate provided at a top end of the first terminal, and an upper terminal plate provided at a top end of the lower terminal plate, the first electrode tab being connected to a bottom end of the first terminal.

The first electrode terminal may further include a lower insulator insulating the bottom end of the first terminal and the cap plate from each other; a seal gasket sealing a gap between the first terminal and the cap plate; and an upper insulator insulating the top end of the first terminal and the cap plate from each other while insulating the terminal plate and the cap plate from each other.

The first electrode tab, the first terminal, and the lower terminal plate may be made of copper or copper alloy, and the upper terminal plate may be made of aluminum or aluminum alloy.

The upper terminal plate and the lower terminal plate may be electrically and physically connected to each other.

The upper terminal plate and the lower terminal plate may be connected to each other by a diffusion weld.

The first terminal and the lower terminal plate may be electrically and physically connected to each other.

The upper terminal plate and the lower terminal plate may be connected to each other by a diffusion weld, and the first terminal and the lower terminal plate may be connected to each other by a laser weld.

The lower terminal plate may include a through-hole into which the top end of the first terminal is inserted, and the upper terminal plate may include an exposure hole exposing at least the through-hole.

The first electrode may includes a first uncoated portion that is not coated with a first active material, the second electrode may include a second uncoated portion that is not coated with a second active material, and the first uncoated portion and the second uncoated portion may outwardly protrude in opposite directions such that the first uncoated portion outwardly protrudes through one side of the separator, and the second uncoated portion outwardly protrudes through another side of the separator.

The secondary battery may further include a first bus bar connected to the upper terminal plate.

The first bus bar may be made of aluminum or aluminum alloy.

The second electrode terminal may further include a second terminal passing through the cap plate and having a bottom end connected to the second electrode tab; a terminal plate connected to a top end of the second terminal; a lower insulator insulating the bottom end of the second terminal and the cap plate from each other; a seal gasket sealing a gap between the second terminal and the cap; and an upper insulator insulating the top end of the second terminal and the cap plate from each other while insulating the terminal plate and the cap plate from each other.

The second electrode tab, the second terminal, and the terminal plate may be made of aluminum or aluminum alloy.

The secondary battery may further include a second bus bar connected to the terminal plate.

The second bus bar may be made of aluminum or aluminum alloy.

The first electrode may be a negative electrode and the second electrode may be a positive electrode.

At least one of the above and other features and advantages may be realized by providing a method of fabricating a secondary battery, the method including preparing a first assembly, the first assembly including an upper terminal plate, a lower terminal plate, a cap plate, and a first terminal having a flange, preparing the first assembly including joining the upper terminal plate and the lower terminal plate together, the upper terminal plate being formed of a first metal, the lower terminal plate being formed of a second metal different from the first metal, subsequently, disposing the lower terminal plate on a first side of the cap plate and passing the first terminal through the cap plate from a second side opposite the first side, such that the flange of the first terminal is at an opposite side of the cap plate from the lower terminal plate, and, subsequently, joining the first terminal and the lower terminal plate together; and installing the first assembly in a case.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Figure 1:
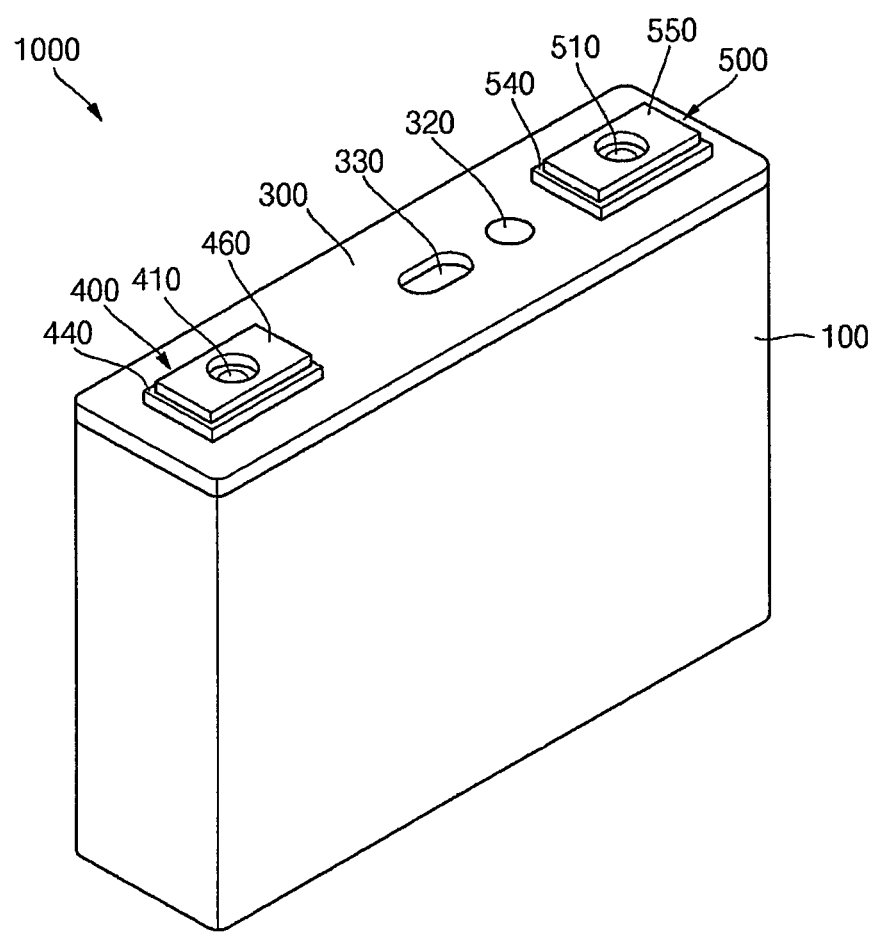
FIG. 1 illustrates a perspective view of a secondary battery according to an embodiment.

Korean Patent Application No. 10-2010-0056963, filed on Jun. 16, 2010, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
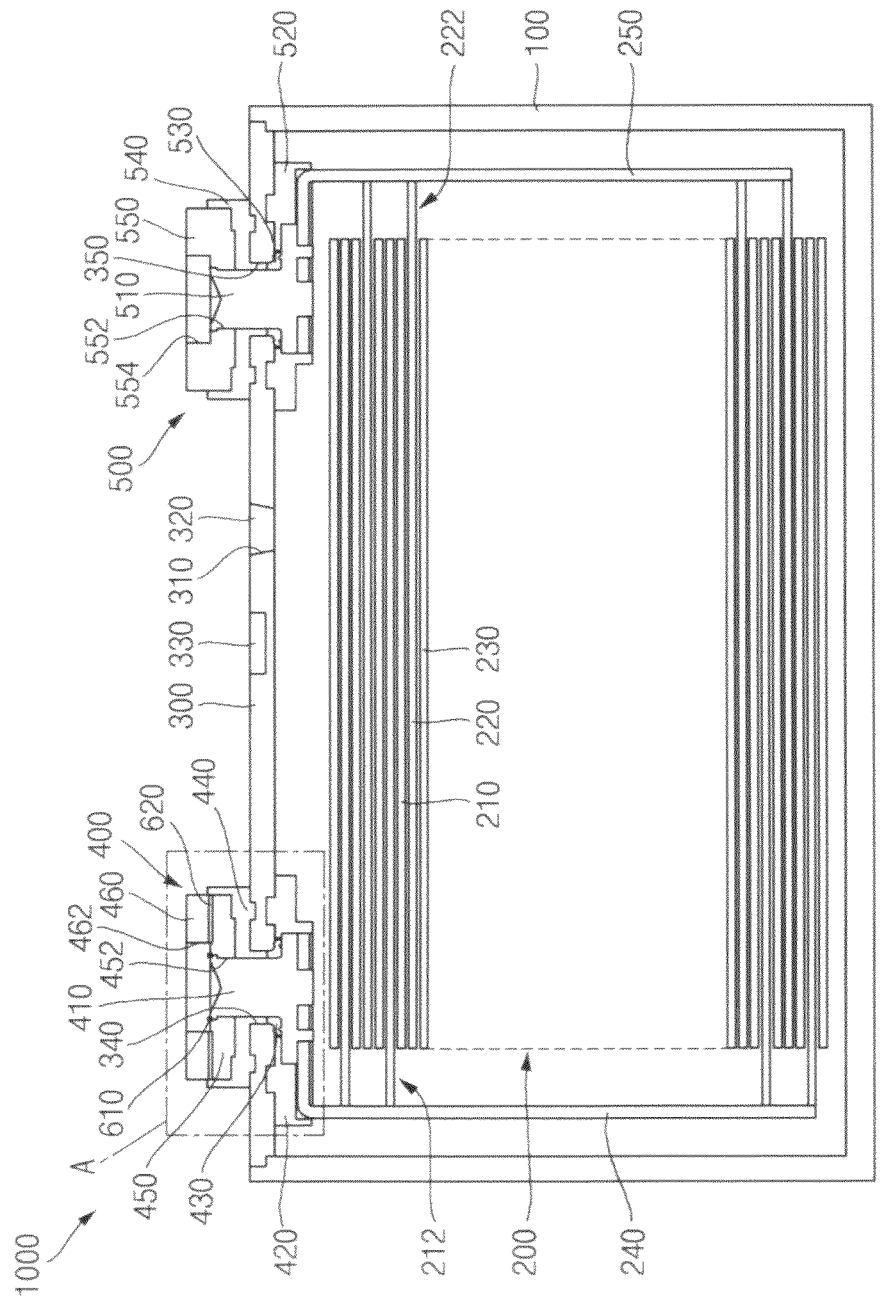
FIG. 2 illustrates a vertical section view of FIG. 1.
Figure 3:
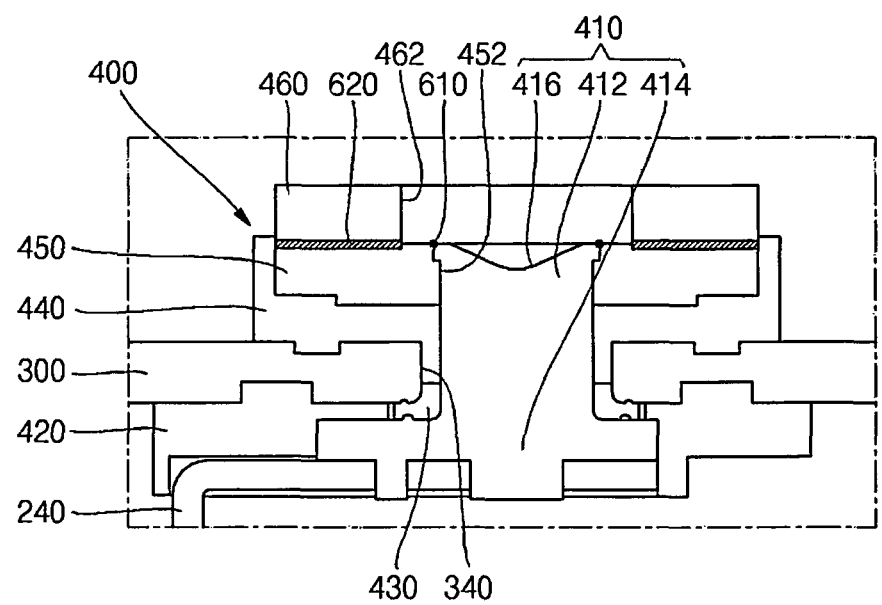
FIG. 3 illustrates an enlarged view of an 'A' area of FIG. 1.

FIG. 1 illustrates a perspective view of a secondary battery according to an embodiment, FIG. 2 illustrates a vertical section view of FIG. 1, and FIG. 3 illustrates an enlarged view of an 'A' area of FIG. 1.

In the example embodiment shown in FIGS. 1 through 3, the secondary battery 1000 includes a case 100, an electrode assembly 200, a cap plate 300, a first electrode terminal 400, and a second electrode terminal 500.

The case 100 may be made of, e.g., a conductive metal such as aluminum, aluminum alloy, or nickel plated steel. The case 100 may have a substantially hexahedron shape. The case 100 may include a receiving part in which the electrode assembly 200 and an electrolyte (not shown) are accommodated. The electrode assembly 200 and the electrolyte (not shown) may be accommodated at one side of the case 100, and may be received in the receiving part of the case 100 through an opening of the case 100. The inner surface of the case 100 may be processed by an insulation treatment to be electrically insulated from the electrode assembly 200. The electrolyte may include, e.g., an organic solvent such as EC, PC, DEC, EMC, or DMC, and a lithium salt such as $LiPF_6$ or $LiBF_4$. The electrolyte may be in a liquid, solid, or gel phase.

The electrode assembly 200 may include a first electrode 210, a second electrode 220, a separator 230, a first electrode tab 240, and a second electrode tab 250.

The electrode assembly 200 may be formed in, e.g., a jelly-roll configuration in which the first electrode 210, the second electrode 220, and the separator 230 are wound together. The first electrode 210 may be a negative electrode and the second electrode 220 may be a positive electrode. In another implementation, the first electrode 210 may be a positive electrode and the second electrode 220 may be a negative electrode. In the following description, for convenience of explanation, it is assumed that the first electrode 210 is a negative electrode and the second electrode 220 is a positive electrode.

The first electrode 210 may include a first collector and a first active material coated portion. When the first electrode 210 is a negative electrode, the first collector may be made of, e.g., copper or copper alloy, and the first active material coated portion may be formed of, e.g., a coating layer with graphite coated as a first active material.

The second electrode 220 may include a second collector and a second active material coated portion. When the second electrode is a positive electrode, the second collector may be made of, e.g., aluminum or aluminum alloy, and the second active material coated portion may be formed of, e.g., a coating layer with lithium oxide coated as a second active material.

The separator 230 may be interposed between the first electrode 210 and the second electrode 220 and may insulate the first electrode 210 and the second electrode 220 from each other.

The separator 230 may be made of, e.g., at least one porous material such as polyethylene (PE), polypropylene (PP), and equivalents thereof.

The separator 230 may be positioned at both sides of the first electrode 210 or both sides of the second electrode 220.

The first electrode 210 may include a first uncoated portion 212 without the first active material coated portion, i.e., a portion that is not coated with the first active material. The first uncoated portion 212 may outwardly protrude through a side of the separator 230.

The second electrode 220 may include a second uncoated portion 222 without the second active material coated portion, i.e., a portion which is not coated with the second active material. The second uncoated portion 222 may outwardly protrude through another side of the separator 230. Thus, the first uncoated portion 212 and the second uncoated portion 222 may protrude in opposite directions.

The first electrode tab 240 may be connected to the first uncoated portion 212. The first electrode tab 240 and the first uncoated portion 212 may be electrically and mechanically connected to each other by welding, for example, laser welding.

The second electrode tab 250 may be connected to the second uncoated portion 222. The second electrode tab 250 and the second uncoated portion 222 may be electrically and mechanically connected to each other by welding, for example, laser welding.

The first electrode tab 240 and the second electrode tab 250 may extend to be connected to the first electrode terminal 400 and the second electrode terminal 500, respectively.

The first electrode tab 240 may be made of, e.g., copper or copper alloy, which may be the same as in the first collector of the first electrode 210. The second electrode tab 250 may be made of, e.g., aluminum or aluminum alloy, which may be the same as in the second collector of the second electrode 220.

The cap plate 300 may hermetically seal the opening of the case 100 accommodating the electrode assembly 200. Sealing of the case 100 and the cap plate 300 may be performed by welding, for example, laser welding, along the edge portion of the cap plate 300.

The cap plate 300 may be made of, e.g., a conductive metal such as aluminum, aluminum alloy, or nickel plated steel, which may be the same as, or similar to, the case 100.

The cap plate 300 may include an electrolyte injection hole 310 provided at a predetermined location to inject an electrolyte into the case 100. Once the electrolyte is injected, the electrolyte injection hole 310 may be sealed by an electrolyte plug 320.

The cap plate 300 may include a safety vent 330 formed at a predetermined location. The safety vent 330 may have a smaller thickness than the other areas. The safety vent 330 may be configured to prevent the secondary battery 1000 from exploding when the internal pressure of the case 100 rises to a predetermined level or higher.

The cap plate 300 may include through-holes 340 and 350 formed at predetermined locations, preferably at locations corresponding to the first electrode tab 240 and the second electrode tab 250, and the first electrode terminal 400 and the second electrode terminal 500 may pass through the through-holes 340 and 350.

The first electrode terminal 400 may include a first terminal 410, a lower insulator 420, a seal gasket 430, an upper insulator 440, a lower terminal plate 450, and an upper terminal plate 460.

For convenience of explanation, the first terminal 410 may be divided into a top end 412 and a bottom end 414. Here, the top end 412 means a predetermined region of an upper portion of first terminal 410 passing through the through-hole 340 of the cap plate 300 and outwardly protruding, and the bottom end 414 means a predetermined region of a lower portion of first terminal 410 located inside the case 100 without passing through the through-hole 340 of the cap plate.

The bottom end 414 of the first terminal 410 may be electrically and physically connected to the first electrode tab 240 of the electrode assembly 200.

A lower insulator 420 may be provided between the bottom end 414 of the first terminal 410 and the cap plate 300 to insulate the bottom end 414 of the first terminal 410 and the cap plate 300 from each other.

The first terminal 410 of the first electrode terminal 400 may be made of, e.g., copper or copper alloy. The first electrode tab 240 may be made of copper or copper alloy. Thus, physically and electrically connecting the first electrode tab 240 to the first terminal 410 of the first electrode terminal 400 may be easily achieved by forming the first terminal 410 using the same material as the first electrode tab 240.

The seal gasket 430 may be provided between the cap plate 300 and the first terminal 410, specifically between the through-hole 340 of the cap plate 300 and the bottom end 414 of the first terminal 410, and may seal a gap between the cap plate 300 and the first terminal 410.

The upper insulator 440 may be provided between the lower terminal plate 450 and the cap plate 300, and may insulate the lower terminal plate 450 and the cap plate 300 from each other.

The lower terminal plate 450 may include a through-hole 452 through which the top end 412 of the first terminal 410 can be inserted. The top end 412 of the first terminal 410 may be inserted into the through-hole 452 of the lower terminal plate 450 to then be fastened.

The fastening of the top end 412 of the first terminal 410 and the lower terminal plate 450 may be achieved by connecting the edge portion of the top end 412 of the first terminal 410 to the through-hole 452 of the lower terminal plate 450 by welding, for example, laser welding.

The lower terminal plate 450 may be made of copper or copper alloy, which may be the same as in the first terminal 410. Using the same material in forming the first terminal 410 and the lower terminal plate 450 allows components made of the same material to be easily connected to each other by welding, such as laser welding. In contrast, welding of components made of different materials is not as easily achieved, and electrical and mechanical characteristics may deteriorate.

A welding mark 610 resulting from the laser welding may be created at a boundary between the top end 412 of first terminal 410 and the lower terminal plate 450.

The upper terminal plate 460 may be provided on the lower terminal plate 450. The upper terminal plate 460 may be made of, e.g., aluminum or aluminum alloy.

The upper terminal plate 460 may include an exposure hole 462 that exposes at least the through-hole 452 of the lower terminal plate 450, preferably, a predetermined region of a surface of the lower terminal plate 450, including the through-hole 452 of the lower terminal plate 450. As illustrated in FIG. 3, the diameter of the exposure hole 462 may be greater than the diameter of the through-hole 452, and thus the exposure hole 462 may expose the predetermined region of the surface of the lower terminal plate 450.

The exposure hole 462 may allow a laser to reach the boundary area between the top end 412 of the first terminal 410 and the lower terminal plate 450 when laser welding is performed on the lower terminal plate 450 and the top end 412 of the first terminal 410. As illustrated in FIG. 3, the top end 412 of the first terminal 410 and the lower terminal plate 450 may be below the upper surface of the upper terminal plate 460, and thus the laser may reach the boundary area between the top end 412 of the first terminal 410 and the lower terminal plate 450 via the exposure hole 462.

The upper terminal plate 460 may be fastened to the lower terminal plate 450 by, e.g., diffusion welding. Diffusion welding may be performed by applying heat and high pressure to weld the upper terminal plate 460 and the lower terminal plate 450 together.

The diffusion welding may easily fasten components made of different materials. Thus, even if the upper terminal plate 460 is made of aluminum or aluminum alloy, unlike the lower terminal plate 450, the upper terminal plate 460 and the lower terminal plate 450 may be easily fastened by the diffusion welding.

As the result of diffusion welding between the lower terminal plate 450 and the upper terminal plate 460, a junction area 620, i.e., a diffusion weld, may be formed between the lower terminal plate 450 and the upper terminal plate 460.

In the first electrode terminal 400, a fastening order of the first terminal 410, the lower terminal plate 450 and the upper terminal plate 460 may be as follows.

First, the lower terminal plate 450 and the upper terminal plate 460 may be fastened to each other by diffusion welding. For example, the lower terminal plate 450 and the upper terminal plate 460 may be fastened to each other while separated from other parts of the battery, which may provide for greater flexibility, e.g., by allowing the plates 450 and 460 to be processed separate from the remaining parts of the battery.

Subsequently, the first terminal 410 may be made to pass through the through-hole 340 of the cap plate 340, so that the top end 412 of the first terminal 410 is exposed to the outside.

Next, the top end 412 of the first terminal 410 may be inserted into the through-hole 452 of the lower terminal plate 450, and the top end 412 of the first terminal 410 may be deformed by pressing a groove 416 in the top end 412 of the first terminal 410, thereby primarily coupling the first terminal 410 to the lower terminal plate 450 in a rivet manner. As illustrated in FIG. 3, the first terminal 410 may be coupled to the lower terminal plate 450 by causing a portion of the top end 412 of the first terminal 410 to extend over a portion of the lower terminal plate 450 (e.g., the portion of the lower terminal plate 450 between the laser weld marks 610 in FIG. 3).

In addition, laser welding may be performed on the first terminal 410 and the lower terminal plate 450 through the exposure hole 462 of the upper terminal plate 460, thereby fastening the first terminal 410, the lower terminal plate 450, and the upper terminal plate 460 to one another. Laser welding may be performed by melting the first terminal 410 and the lower terminal plate 450 together, such that a melt zone includes metal from each of the first terminal 410 and the lower terminal plate 450.

Other components of the first electrode terminal 400, e.g., the lower insulator 420, the seal gasket 430, and the upper insulator 440, may be interposed between the first terminal 410 and the cap plate 300, or between the lower terminal plate 450 and the cap plate 300.

In the first electrode terminal 400 of the secondary battery 1000 according to an embodiment, the first terminal 410 connected to the first electrode tab 240 connected to the first electrode 210 of the electrode assembly 200 and the lower terminal plate 450 may be formed using the same material as the first electrode tab 240, while the upper terminal plate 460 connected to other external devices (for example, bus bars) may be formed using a material different from that of the first terminal 410 connected to the first electrode tab 240 or the lower terminal plate 450.

The second electrode terminal 500 may include a second terminal 510, a lower insulator 520, a seal gasket 530, an upper insulator 540, and a terminal plate 550.

In the second electrode terminal 500, the lower insulator 520, the seal gasket 530, and the upper insulator 540 may be substantially the same with the lower insulator 420, the seal gasket 430 and the upper insulator 440 provided in the first electrode terminal 400, and a detailed description thereof will not be repeated.

The second terminal 510 may be substantially the same as the first terminal 410 of the first electrode terminal 400, except that it is connected to the second electrode tab 250, and is formed using the same material with the second electrode tab 250, e.g., aluminum or aluminum alloy, and a detailed description thereof will not be repeated.

Compared to the lower terminal plate 450, the terminal plate 550 may be modified in a manner that the lower terminal plate 450 and the upper terminal plate 460 are integrally formed in the first electrode terminal 400. However, the terminal plate 550 may be entirely formed using aluminum or aluminum alloy.

For example, the terminal plate 550 may include a through-hole 552 and an exposure hole 554, which perform the same and corresponding functions of the through-hole 452 and the exposure hole 462 provided in the lower terminal plate 450 and the upper terminal plate 460 of the first electrode terminal 400.

Therefore, in the secondary battery 1000, the first electrode terminal 400 includes the upper terminal plate 460 made of a different material from the first electrode tab 240, while the second electrode terminal 500 includes the terminal plate 550 made of the same material with the second electrode tab 250. The upper terminal plate 460 of the first electrode terminal 400 and the terminal plate 550 of the second electrode terminal 500 may be made of the same material, preferably aluminum or aluminum alloy having an excellent characteristic in welding components made of the same material. The first electrode tab 240 may not be formed using the same material with the upper terminal plate 460 because the first electrode tab 240 is connected to the first electrode 210. In a case where the first electrode 210 is a negative electrode, the first collector of the first electrode 210 is preferably made of copper or copper alloy.

Conversely, the upper terminal plate 460 of the first electrode terminal 400 and the terminal plate 550 of the second electrode terminal 500 may be made of, e.g., copper or copper alloy. In this case, however, the welding characteristic of copper and copper or copper alloy is poorer than that of aluminum and aluminum or aluminum alloy, and a relatively large amount of heat may be disadvantageously introduced during welding.

Figure 4:
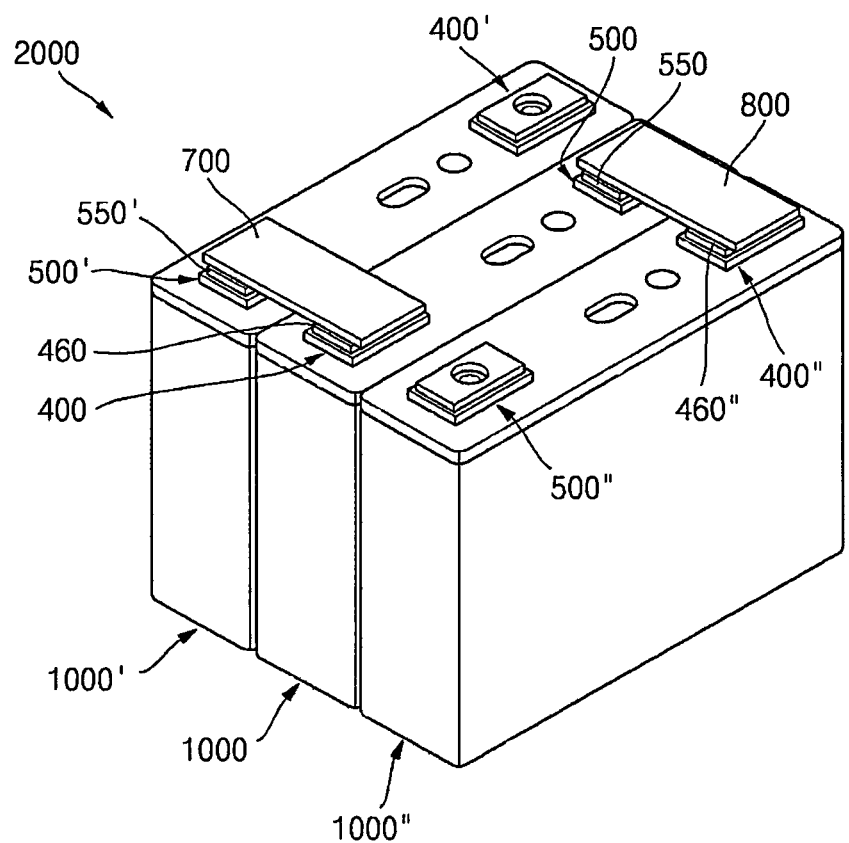
FIG. 4 illustrates a battery pack including a plurality of battery cells connected to each other according to an embodiment.

FIG. 4 illustrates a battery pack including a plurality of battery cells connected to each other according to an embodiment.

In the example embodiment shown in FIG. 4, the battery pack 2000 includes a plurality of battery cells connected to each other, e.g., a plurality of the secondary batteries 1000 illustrated in FIGS. 1 through 3. The battery pack 2000 may include a first secondary battery 1000' adjacent to one side of the secondary battery 1000, a second secondary battery 1000" adjacent to the other side of the secondary battery 1000, a first bus bar 700, and a second bus bar 800. The first secondary battery 1000' and the second secondary battery 1000" have the same configuration as the secondary battery 1000 described with reference to FIGS. 1 through 3. Therefore, in the following description of the first secondary battery 1000' and the second secondary battery 1000", the same components with those shown in FIGS. 1 through 3 are denoted by the same reference numerals, and a detailed description thereof will not be repeated.

The first bus bar 700 and the second bus bar 800 may be made of aluminum or aluminum alloy.

In the battery pack 2000, the secondary battery 1000, the first secondary battery 1000' and the second secondary battery 1000" may be connected in series to each other. For example, the upper terminal plate 460 of the first electrode terminal 400 provided in the secondary battery 1000 may be electrically connected to a terminal plate 550' of a second electrode terminal 500' provided in the secondary battery 1000' through a first bus bar, and the terminal plate 550 of the second electrode terminal 500 provided in the secondary battery 1000 may be electrically connected to an upper terminal plate 460" of a first electrode terminal 400" provided in the second secondary battery 1000" through a second bus bar 800.

In a case where a high voltage is required, a plurality of secondary batteries 1000 adjacent to each other may be directly electrically connected to each other using multiple bus bars, that is, the first bus bar 700 and the second bus bar 800.

In FIG. 4, reference numeral 400' denotes a first electrode terminal of the first secondary battery 1000', and reference numeral 500" denotes a second electrode terminal of the second secondary battery 1000".

As described above, embodiments may provide a secondary battery configured to connect bus bars made of aluminum or aluminum alloy to both first and second electrode terminals.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A secondary battery, comprising:
an electrode assembly including a first electrode, a second electrode, a separator interposed between the first electrode and the second electrode and insulating the first electrode and the second electrode from each other, and a first electrode tab and a second electrode tab connected to the first electrode and the second electrode, respectively;

a case including a receiving part that receives the electrode assembly, the case having an open side;

a cap plate sealing the open side of the case; and a first electrode terminal and a second electrode terminal passing through the cap plate, the first electrode terminal being connected to the first electrode tab, the second electrode terminal being connected to the second electrode tab, wherein:

the first electrode terminal includes a first terminal and a multi-plate structure including a lower terminal plate and an upper terminal plate, the lower terminal plate provided at a top end of the first terminal, and the upper terminal plate provided over the lower terminal plate, the first electrode tab being connected to a bottom end of the first terminal, the second electrode terminal includes a second terminal with an upper end connected to a one-plate structure different from the multi-plate structure of the first electrode terminal, the first electrode tab, the first terminal, and the lower terminal plate is made of a first material, the upper terminal plate is made of a second material different from the first material; and the one-plate structure of the second terminal is made from a material different from the first material, and further comprising a first bus bar connected to the upper terminal plate and a second bus bar connected to the one-plate structure.

2. The secondary battery as claimed in claim 1, wherein the first electrode terminal further includes:

a lower insulator insulating the bottom end of the first terminal and the cap plate from each other;

a seal gasket sealing a gap between the first terminal and the cap plate; and an upper insulator insulating the top end of the first terminal and the cap plate from each other while insulating the lower terminal plate and the cap plate from each other.

3. The secondary battery as claimed in claim 1, wherein the upper terminal plate and the lower terminal plate are electrically and physically connected to each other.

4. The secondary battery as claimed in claim 3, wherein the upper terminal plate and the lower terminal plate are connected to each other by a diffusion weld.

5. The secondary battery as claimed in claim 3, wherein the first terminal and the lower terminal plate are electrically and physically connected to each other.

6. The secondary battery as claimed in claim 5, wherein:

the upper terminal plate and the lower terminal plate are connected to each other by a diffusion weld, and the first terminal and the lower terminal plate are connected to each other by a laser weld.

7. The secondary battery as claimed in claim 1, wherein:

the lower terminal plate includes a through-hole into which the top end of the first terminal is inserted, and the upper terminal plate includes an exposure hole exposing at least the through-hole.

8. The secondary battery as claimed in claim 1, wherein the first electrode includes a first uncoated portion that is not coated with a first active material, the second electrode includes a second uncoated portion that is not coated with a second active material, and the first uncoated portion and the second uncoated portion outwardly protrude in opposite directions such that the first uncoated portion outwardly protrudes through one side of the separator, and the second uncoated portion outwardly protrudes through another side of the separator.

9. The secondary battery as claimed in claim 1, wherein the first bus bar is made of aluminum or aluminum alloy.

10. The secondary battery as claimed in claim 1, wherein:

the second terminal passes through the cap plate and has a bottom end connected to the second electrode tab, and the one-plate structure is connected to a top end of the second terminal, and wherein the second electrode terminal further includes:

a lower insulator insulating the bottom end of the second terminal and the cap plate from each other;

a seal gasket sealing a gap between the second terminal and the cap; and an upper insulator insulating the top end of the second terminal and the cap plate from each other while insulating the one-plate structure and the cap plate from each other.

11. The secondary battery as claimed in claim 10, wherein the second electrode tab, the second terminal, and the one-plate structure are made of aluminum or aluminum alloy.

12. The secondary battery as claimed in claim 11, wherein the second bus bar is made of aluminum or aluminum alloy.

13. The secondary battery as claimed in claim 1, wherein the first electrode is a negative electrode and the second electrode is a positive electrode.

14. A secondary battery, comprising:

an electrode assembly including a first electrode, a second electrode, a separator interposed between the first electrode and the second electrode and insulating the first electrode and the second electrode from each other, and a first electrode tab and a second electrode tab connected to the first electrode and the second electrode, respectively;

a case including a receiving part that receives the electrode assembly, the case having an open side;

a cap plate sealing the open side of the case; and a first electrode terminal and a second electrode terminal passing through the cap plate, the first electrode terminal being connected to the first electrode tab, the second electrode terminal being connected to the second electrode tab, the first electrode terminal including a first terminal and a multi-plate structure including a lower terminal plate provided at a top end of the first terminal and an upper terminal plate provided at a top end of the lower terminal plate, the first electrode tab being connected to a bottom end of the first terminal, the second electrode terminal including a second terminal with an upper end connected to a one-plate structure different from the multi-plate structure of the first electrode terminal, wherein:

the first terminal has an upper surface facing away from the electrode assembly, the upper terminal plate has an upper surface facing away from the electrode assembly, the upper surface of the first terminal is a first distance from the cap plate, the upper surface of the upper terminal plate is a second distance from the cap plate, the first distance is less than the second distance, the first electrode tab, the first terminal, and the lower terminal plate of the first electrode terminal and the second terminal and the one-plate structure of the second electrode terminal made from a first material, and the upper terminal plate of the first electrode terminal made of a second material different from the first material, and further comprising a first bus bar connected to the upper terminal plate and a second bus bar connected to the one-plate structure.

15. A secondary battery, comprising:

an electrode assembly including a first electrode, a second electrode, a separator interposed between the first electrode and the second electrode and insulating the first electrode and the second electrode from each other, and a first electrode tab and a second electrode tab connected to the first electrode and the second electrode, respectively;

a case including a receiving part that receives the electrode assembly, the case having an open side;

a cap plate sealing the open side of the case; and a first electrode terminal and a second electrode terminal passing through the cap plate, the first electrode terminal being connected to the first electrode tab, the second electrode terminal being connected to the second electrode tab, the first electrode terminal including a first terminal and a multi-plate structure including a lower terminal plate and an upper terminal plate, the lower terminal plate provided at a top end of the first terminal, and the upper terminal plate provided at a top end of the lower terminal plate, the first electrode tab being connected to a bottom end of the first terminal, the second electrode terminal having a second terminal with an upper end connected to a one-plate structure different from the multi-plate structure of the first electrode terminal, wherein:

the lower terminal plate includes:

an upper surface facing away from the electrode assembly, and a through-hole into which the top end of the first terminal is inserted, and the upper terminal plate includes an exposure hole exposing at least the through-hole and the upper surface of the lower terminal plate, and further comprising a first bus bar connected to the upper terminal plate and a second bus bar connected to the one-plate structure.

16. The secondary battery as claimed in claim 15, wherein:

the exposure hole has a first diameter, the through-hole has a second diameter, and the first diameter is greater than the second diameter.

17. The secondary battery as claimed in claim 15, wherein the top end of the first terminal extends over the upper surface of the lower terminal plate.

\* \* \* \* \*